(12) United States Patent
Nakamura (10) Patent No.: US 7,340,277 B2
(45) Date of Patent: Mar. 4, 2008

(54) ADAPTIVE ANTENNA FOR CONTROLLING THE WEIGHTING ON A PLURALITY OF ANTENNA ELEMENTS

(75) Inventor: Hiroshi Nakamura, Minato-ku (JP)

(73) Assignee: NEC Corporation, Tokyo (JP)

( * ) Notice: Subject to any disclaimer, the term of this patent is extended or adjusted under 35 U.S.C. 154(b) by 555 days.

(21) Appl. No.: 10/432,865

(22) PCT Filed: Nov. 22, 2001

(86) PCT No.: PCT/JP01/10204

§ 371 (c)(1),
(2), (4) Date: May 28, 2003

(87) PCT Pub. No.: WO02/45295

PCT Pub. Date: Jun. 6, 2002

(65) Prior Publication Data

US 2004/0033818 A1  Feb. 19, 2004

(30) Foreign Application Priority Data

Nov. 30, 2000  (JP)  ............................... 2000-365037

(51) Int. Cl.
H04M 1/00 (2006.01)
G01S 13/78 (2006.01)

(52) U.S. Cl. ................ 455/561; 455/456.1; 455/404.2; 455/25; 455/63.4; 342/46; 342/153; 342/154; 342/386

(58) Field of Classification Search ............. 455/456.1, 455/404.2, 25, 63.4, 67.16, 561, 562.1; 342/42, 342/46, 153, 357.12, 163, 461, 154, 357.07, 342/354, 357.17, 386

See application file for complete search history.

(56) References Cited

U.S. PATENT DOCUMENTS

| | | | | |
|---|---|---|---|---|
| 4,179,696 A | * | 12/1979 | Quesinberry et al. ......... 342/75 |
| 4,843,397 A | * | 6/1989 | Galati et al. ................... 342/59 |
| 5,317,323 A | * | 5/1994 | Kennedy et al. ............. 342/457 |
| 5,452,211 A | * | 9/1995 | Kyrtsos et al. .............. 701/215 |
| 5,455,588 A | * | 10/1995 | Lew et al. ................... 342/104 |
| 5,515,378 A | * | 5/1996 | Roy et al. .................... 370/334 |
| 5,774,829 A | * | 6/1998 | Cisneros et al. ............ 701/213 |
| 5,838,276 A | * | 11/1998 | Chapman et al. ............. 342/35 |
| 5,856,804 A | * | 1/1999 | Turcotte et al. ............. 342/371 |

(Continued)

FOREIGN PATENT DOCUMENTS

EP  0 869 578 A1  10/1998

(Continued)

Primary Examiner—George Eng
Assistant Examiner—Huy Phan
(74) Attorney, Agent, or Firm—Sughrue Mion, PLLC (57) ABSTRACT

An optical subscriber system according to the present invention has an adaptive antenna having a plurality of antenna elements, for controlling the weighting on the antenna elements thereby to radiate beams that are adapted to radio wave environments, a position estimator for estimating the position of a mobile unit, a beam combiner for weighting signals received from the mobile unit by the antenna elements and combining beams, and a weighting coefficient generator for correcting weighting coefficients adapted to radio wave environments, which give initial weights as weights to form nulls in bearings other than the mobile unit based on the position of the mobile unit which has been estimated by the position estimator, for thereby reducing a time required for convergence.

12 Claims, 5 Drawing Sheets

U.S. PATENT DOCUMENTS

| | | | |
|---|---|---|---|
| 6,009,335 A * | 12/1999 | Murphy | 455/423 |
| 6,035,209 A | 3/2000 | Tiedemann, Jr. et al. | |
| 6,275,186 B1 * | 8/2001 | Kong | 342/363 |
| 6,341,214 B2 * | 1/2002 | Uesugi | 455/69 |
| 6,449,484 B1 * | 9/2002 | Grubeck et al. | 455/450 |
| 6,456,827 B1 * | 9/2002 | Kubo et al. | 455/68 |
| 6,473,619 B1 * | 10/2002 | Kong et al. | 455/456.1 |
| 6,492,942 B1 * | 12/2002 | Kezys | 342/368 |
| 6,529,745 B1 * | 3/2003 | Fukagawa et al. | 455/562.1 |
| 6,677,898 B2 * | 1/2004 | Cheng et al. | 342/372 |
| 6,697,629 B1 * | 2/2004 | Grilli et al. | 455/456.1 |
| 6,707,805 B2 * | 3/2004 | Ozluturk et al. | 370/335 |
| 6,718,174 B2 * | 4/2004 | Vayanos | 455/456.1 |
| 6,731,916 B1 * | 5/2004 | Haruyama | 455/194.2 |
| 6,937,865 B1 * | 8/2005 | Bloebaum et al. | 455/456.1 |
| 2003/0156061 A1 * | 8/2003 | Ohira | 342/372 |

FOREIGN PATENT DOCUMENTS

| | | |
|---|---|---|
| EP | 0926916 A2 | 6/1999 |
| EP | 0 932 218 A2 | 7/1999 |
| JP | 7-87011 A | 3/1995 |
| JP | 07-140232 A | 6/1995 |
| JP | 8-139661 A | 5/1996 |
| JP | 8-274687 A | 10/1996 |
| JP | H09-121378 A | 5/1997 |
| JP | 11-215049 | 8/1999 |
| JP | H11-252614 A | 9/1999 |
| JP | 2000-022618 A | 1/2000 |
| JP | 2000-023225 A | 1/2000 |
| JP | 2000-023244 A | 1/2000 |
| JP | 2000-307504 A | 11/2000 |
| WO | WO 97/23785 A1 | 7/1997 |

* cited by examiner

ADAPTIVE ANTENNA FOR CONTROLLING THE WEIGHTING ON A PLURALITY OF ANTENNA ELEMENTS

TECHNICAL FIELD

The present invention relates to a mobile unit communication apparatus and more particularly to a mobile unit communication apparatus capable of providing excellent communication quality in mobile communications which encounter intermittent communication sessions from mobile units, such as packet communications.

BACKGROUND ART

According to the general mobile radio communication technology, there has been realized a radio access system having radio cells (or cells) with which a bas station can communicate in an area defined around the base station, the radio access system accommodating a plurality of mobile terminals. The overall communication capacity of the radio access system is increased by using different frequencies and spreading codes between adjacent cells for reusing frequencies.

Figure 1:
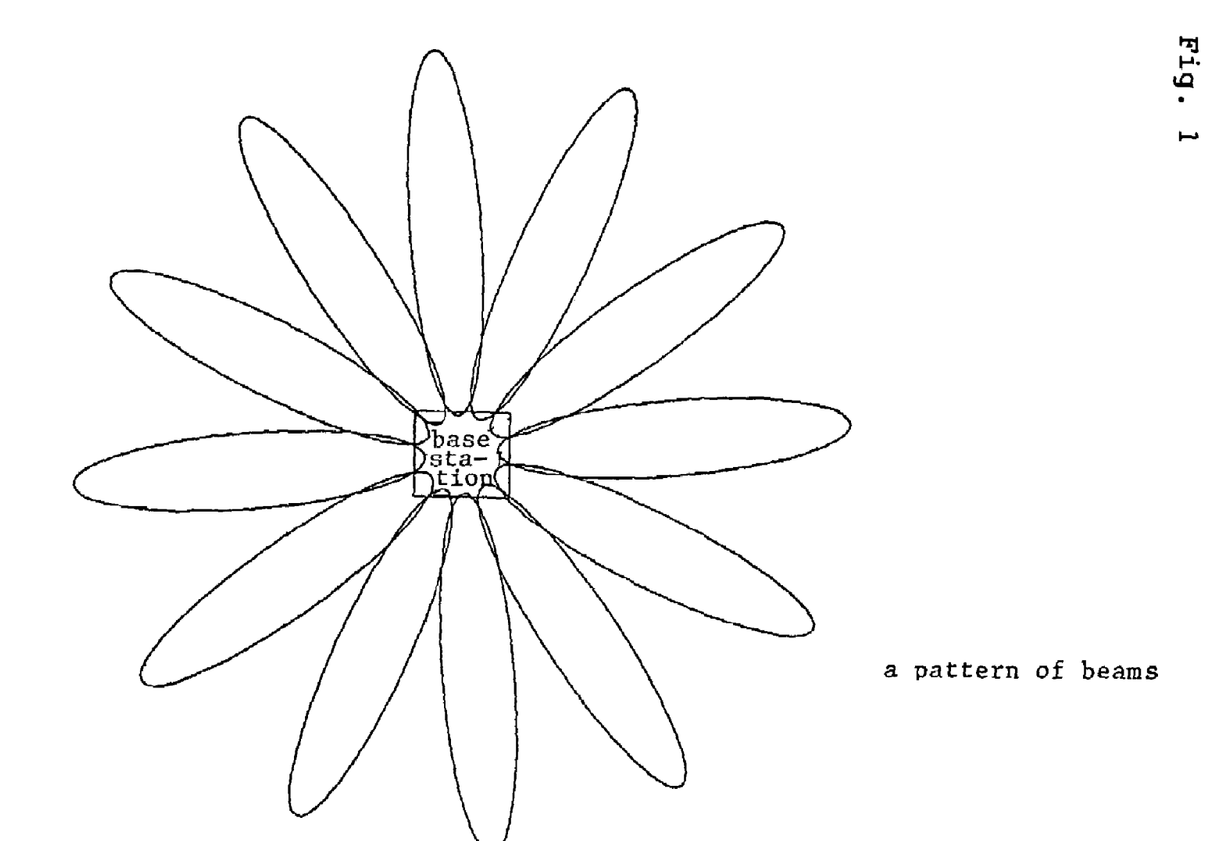
FIG. 1 is a diagram showing a pattern of beams radiated from a base station in an antenna device of a radio communication system disclosed in the prior art.

One example of a radio communication system which employs adaptive antennas in conventional mobile communications is disclosed in Japanese laid-open patent publication No. 7-87011. FIG. 1 of the accompanying drawings shows a pattern of beams radiated from a base station in an antenna device of the radio communication system disclosed in the above publication. As shown in FIG. 1, predetermined angularly narrow beams are generated in desired directions under directivity control to cover all bearings. The radio communication system disclosed in the above publication inspects a change in the intensity of received electric power which occurs as a communicating mobile unit (also referred to as "terminal station" in the present specification) moves and adapts itself to the movement of the mobile unit under directivity control.

Japanese laid-open patent publication No. 2000-22618 discloses a base station in a radio access system which changes the direction of an antenna and a beam angle based on the positional information of mobile terminals to minimize interferences between radio links to increase the number of mobile terminals that can be accommodated by cells of the base station. While the systems disclosed in Japanese laid-open patent publications Nos. 7-87011 and 2000-22618 predict positions and control beam directions and beam widths, they select beams of predetermined beam characteristics, and do not adaptively control beam characteristics to form nulls in the directions of given interference signals by adapting themselves to radio wave environments.

DISCLOSURE OF THE INVENTION

It is an object of the present invention to provide a mobile unit communication apparatus capable of providing excellent communication quality by orienting the beam directivity of an adaptive antenna to a mobile unit in mobile communications which encounter intermittent communication sessions from mobile units, such as packet communications.

According to a first invention of the present application which will solve the above problems, there is provided a mobile unit communication apparatus comprising an adaptive antenna having a plurality of antenna elements, for controlling the weighting on the antenna elements thereby to radiate beams that are adapted to radio wave environments, a position estimator for estimating the position of a mobile unit, a beam combiner for weighting signals received from the mobile unit by the antenna elements and combining beams, and a weighting coefficient generator for correcting weighting coefficients adapted to radio wave environments, which give initial weights as weights to form nulls in bearings other than the mobile unit based on the position of the mobile unit which has been estimated by the position estimator, for thereby reducing a time required for convergence.

With the above arrangement, based on the position of the mobile unit which has been estimated by the position estimator, initial weights are given as weights to form nulls in bearings other than the mobile unit, and weighting coefficients adapted to radio wave environments are corrected. Even when intermittent communication sessions are being made from a mobile unit such as in packet communications, it is possible to achieve excellent communication quality by orienting the beam directivity of the adaptive antenna to a terminal station with which to communicate, and forming nulls for other mobile units acting as interference sources.

According to a second invention of the present application, in the mobile unit communication apparatus according to the first invention, the position estimator has a speed estimator for being supplied with the signals which have been received from the mobile unit by the antenna elements, and estimating the speed of the mobile unit based on a phase shift from a reference value of a predetermined pilot signal component.

With the above arrangement, since the speed of the mobile unit can be estimated, even when the mobile unit is making intermittent communication sessions, it is possible to perform an adaptive beam control process depending on the position of the terminal station for maximizing a signal-to-noise/interference ratio for a terminal station which is being handled and minimizing interferences for other terminal stations.

According to a third invention of the present application, in the mobile unit communication apparatus according to the first invention, the position estimator has a speed estimator for estimating the speed of the mobile unit based on a change in a pilot signal outputted from the beam combiner.

With the above arrangement, since the speed of the mobile unit can be estimated, even when the mobile unit is making intermittent communication sessions, it is possible to perform an adaptive beam control process depending on the position of the terminal station for maximizing a signal-to-noise/interference ratio for a terminal station which is being handled and minimizing interferences for other terminal stations.

According to a fourth invention of the present application, the mobile unit communication apparatus according to any one of the first through third inventions further comprises a weight corrector for correcting the weights with estimated values of the speed at which the mobile unit moves and the direction in which the mobile unit moves.

With the above arrangement, it is possible to carry out an adaptive control process capable of convergence within a short time even when the terminal station moves and also when the terminal station is making intermittent communication sessions such as packet communications.

According to a fifth invention of the present application, there is provided a mobile unit communication system comprising a mobile unit communication apparatus according to any one of the first through fourth inventions wherein the position estimator has a distance predictor, a transmitted electric power controller for controlling transmitted electric power depending on a predicted distance, and a transmitted electric power controller mounted on a mobile unit for transmitting a predicted distance to the mobile unit and controlling transmitted electric power of the mobile unit depending on the predicted distance.

With the above arrangement, it is possible to properly set transmitted electric power from the initial establishment of a radio link between the base station and the mobile unit, reduce the time required for achieving optimum transmitted electric power, and provide an optimum communication environment for a high-speed mobile unit.

BEST MODE FOR CARRYING OUT THE INVENTION

Mobile unit communication apparatus according to embodiments of the present invention will be described below with reference to the drawings.

Figure 2:
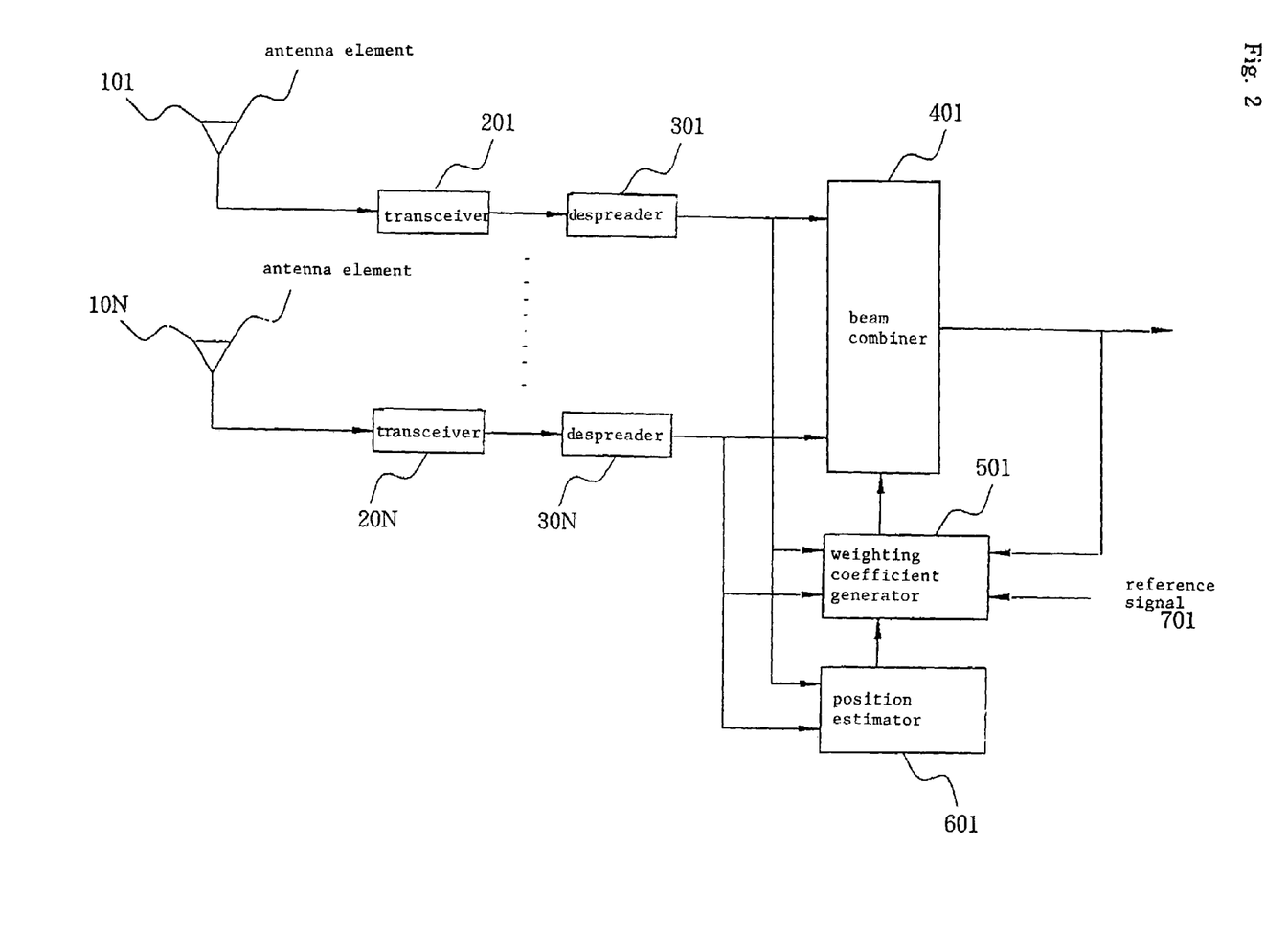
FIG. 2 is a diagram showing an arrangement of a mobile unit communication apparatus according to the present invention and operation thereof.

FIG. 2 is a diagram showing an arrangement of a mobile unit communication apparatus according to the present invention and operation thereof. As shown in FIG. 2, the mobile unit communication apparatus according to the present invention comprises an adaptive antenna having a plurality of antenna elements 101 through 10N, for controlling the weighting on antenna elements 101 through 10N thereby to radiate beams that are adapted to radio wave environments, position estimator 601 for estimating the position of a mobile unit, beam combiner 401 for weighting signals received from the mobile unit by antenna elements 101 through 10N and combining beams, and weighting coefficient generator 501 for correcting weighting coefficients adapted to radio wave environments, which give initial weights as weights to form nulls in bearings other than the mobile unit based on the position of the mobile unit which has been estimated by position estimator 601.

The mobile unit communication apparatus shown in FIG. 2 also has transceivers 201 through 20N for converting signals received from a mobile unit into signals having predetermined frequencies and despreaders 301 through 30N for demodulating the received signals which have been converted into the signals having predetermined frequencies. The signals received by antenna elements 101 through 10N are supplied via respective transceivers 201 through 20N to respective despreaders 301 through 30N.

The received signals which have been demodulated by respective despreaders 301 through 30N are then supplied to beam combiner 401, weighting coefficient generator 501, and position estimator 601.

Beam combiner 401 weights the signals which have been received by respective antenna elements 101 through 10N and demodulated by respective despreaders 301 through 30N according to the weighting coefficients outputted from coefficient generator 501, and combines the weighted signals into a desired received adaptive beam pattern.

Weighting coefficient generator 501 is supplied with the received signals which have been demodulated by respective despreaders 301 through 30N, the beam outputted from beam combiner 401, reference signal 701, and the estimated position outputted from position estimator 601, calculates an error signal representing an error between reference signal 701 and the beam outputted from beam combiner 401, and multiplies the error signal by the received signals which have been demodulated by respective despreaders 301 through 30N thereby to calculate weighting coefficients. Weighting coefficient generator 501 further multiplies the weighting coefficients by a corrective coefficient depending on the estimated position for thereby generating weighting coefficients to be outputted to beam combiner 401 which have been adapted to radio wave environments, which give initial weights as weights to form nulls in bearings other than the mobile unit. The weighting coefficients thus generated serve to reduce the time required for convergence.

Figure 3:
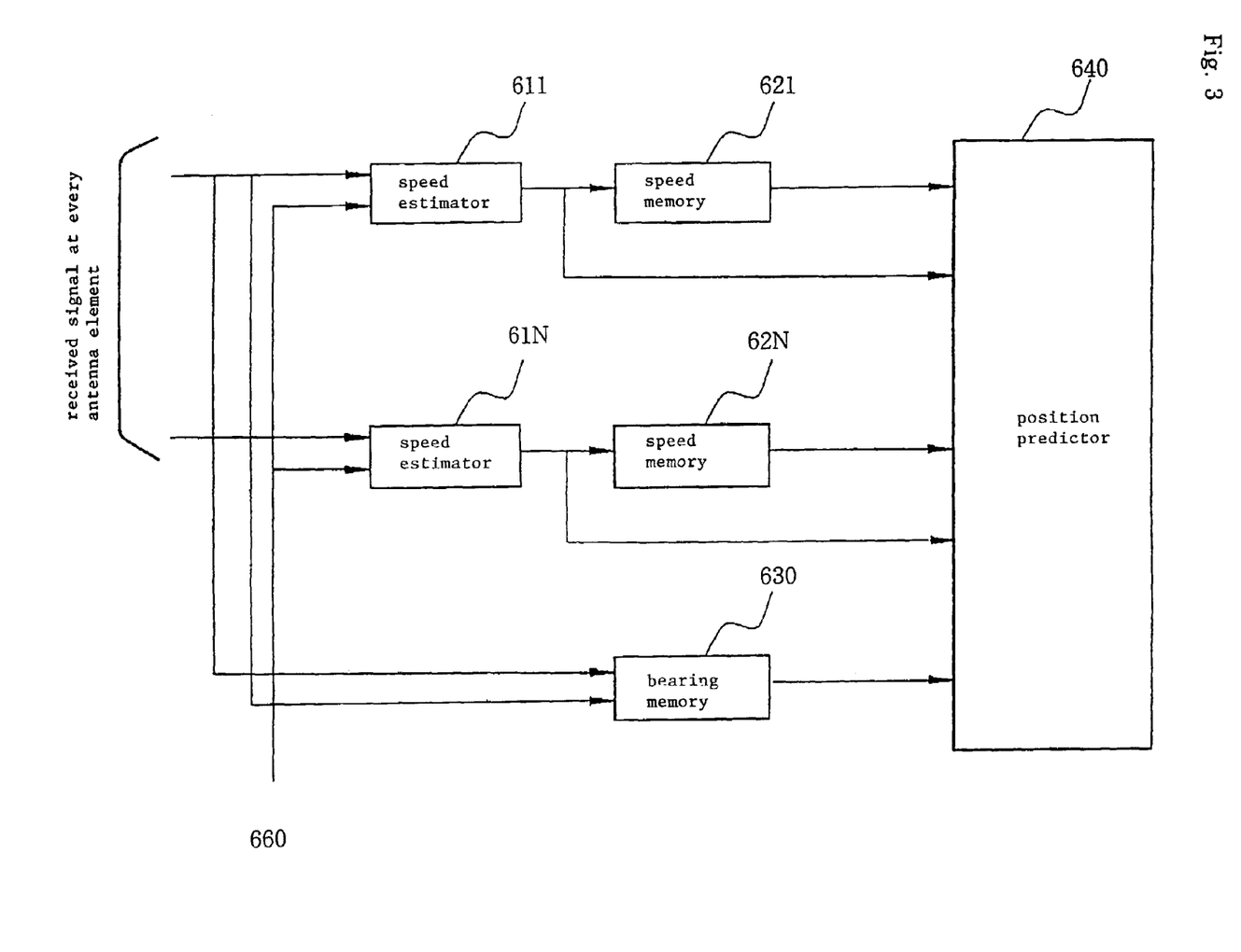
FIG. 3 is a diagram showing an arrangement and operation of a position estimator in the mobile unit communication apparatus according to the present invention.

An embodiment of position estimator 601 will be described with reference to the drawings. FIG. 3 shows an arrangement and operation of an embodiment of position estimator 601.

As shown in FIG. 3, position estimator 601 comprises speed estimators 611 through 61N for being supplied with the received signals which have been demodulated by respective despreaders 301 through 30N and estimating the present speed of a terminal station, speed memories 621 through 62N for being supplied with estimated speeds inputted from speed estimators 611 through 61N and storing past speeds of the terminal station, bearing memory 630 for being supplied with the received signals which have been demodulated by respective despreaders 301 through 30N, calculating the bearing of the terminal station, and storing the present and past bearings of the terminal station, and position predictor 640 for being supplied with signals outputted from speed estimators 611 through 61N, speed memories 621 through 62N, and bearing memory 630.

Since position estimator 601 has speed estimators 611 through 61N, it can estimate the speed at which the mobile unit moves. Therefore, even when the mobile unit is making intermittent communication sessions, it is possible to perform an adaptive beam control process depending on the position of the terminal station for maximizing a signal-to-noise/interference ratio for a terminal station which is being handled and minimizing interferences for other terminal stations.

Speed estimators 611 through 61N are supplied with the received signals from corresponding despreaders 301 through 30N, and calculate the speed of the terminal station based on a phase shift of pilot signal 660 from a reference value. The signals outputted from signal estimators 611 through 61N are supplied corresponding speed memories 621 through 62N and position predictor 640.

Bearing memory 630 calculates the bearing in which the received signals arrive based on an inherent value produced by a correlating process between the signals which have been received by antenna elements 101 through 101N and demodulated by despreaders 301 through 30N.

Position predictor 640 is supplied with signals outputted from speed estimators 611 through 61N, speed memories 621 through 62N, and bearing memory 630, and estimates a future position to which the terminal station will move based on a change in the speed and a change in the bearing.

Operation of position estimator 601 shown in FIG. 3 will be described below.

It is well known in the art that while the terminal station is in motion, a radio wave radiated from the mobile unit thereof is subject to the Doppler effect. Therefore, the signals received by antenna elements 101 through 101N include an added phase shift due to the Doppler effect. It is possible to estimate the speed of the terminal station by extracting the Doppler quantity.

Specifically, it is assumed that the phase of bits of the pilot signal at time t(0) is represented by θ(0), the phase of bits of the pilot signal at time t(1) by θ(1), and so on, and a phase shift Δθ between two times is calculated. In an example between time t(0) and time t(1), the phase shift Δθ is expressed by Δθ=θ(1)−θ(0). Based on the relationship between the Doppler frequency and the angular velocity and also the relationship between the Doppler frequency and the speed of the terminal station, speed V is calculated by the following equation:

$$V = f * \lambda$$

where λ: the wavelength, f: Doppler frequency, f=(Δθ/Δt)2π, and Δt=t(1)−t(0).

Δt is selected depending on the speed of the terminal station that is assumed. For example, if the mobile unit communication apparatus employs the CDMA system, then Δt is selected from one chip, one slot, or one frame of the shortest code modulation. One type may be selected or different types may be switched depending on a change in the speed of the mobile unit. The estimated speeds calculated by speed estimators 611 through 61N for the respective received signals from antenna elements 101 through 10N are then averaged by position predictor 640. The estimated speeds may be averaged as a simple added mean value or a weighted mean value weighted by the intensities of the signals received by the antenna elements.

Bearing memory 630 calculates the bearing in which the received signals arrive based on a correlating process (an analysis of an inherent value of a correlation matrix, so-called a MUSIC process) between the signals which have been received by antenna elements 101 through 101N, and stores the calculated bearing. The calculated bearing and chronological data of stored bearings are supplied to position predictor 640.

Position predictor 640 calculates an acceleration based on a change in the estimated speed within a predetermined time (Δt) and a bearing in which the terminal station moves based on the positive or negative nature of the speed and the chronological data of bearings, and estimates the position to which the terminal station will move using the three parameters including the acceleration, the speed, and the moving bearing. In order to orient the directivity to the estimated position (direction) to which the terminal station will move, the weighting coefficients for combining the beams which are presently generated are multiplied by a corrective coefficient (e.g., exp(−Δθd) where −Δθd represents the difference between the present and estimated bearings). If a terminal station other than the terminal station a terminal station other than the terminal station which is being handled is acting as an intensive interference source, then weighting coefficients are calculated to give a restrictive condition such that the beam pattern which is being generated at present will have a new null in the estimated position to which the terminal station as an intensive interference source will move and will have directivity for the terminal station which is being handled.

In this case, simply multiplying the weighting coefficients by exp(−Δθd) would move a null point and fail to produce optimum weighting coefficients. The process of calculating weighting coefficients for giving a restrictive condition is already known in many documents.

Since the motile communication device according to the present invention estimates the position to which a terminal station will move, even when intermittent communication sessions are being made from a mobile unit such as in packet communications, it is possible at all times to generate adaptive beams having a null in an interference bearing and having directivity for a terminal station which is being handled.

The motile communication device according to the present embodiment may have a weight corrector for correcting weights using estimated values of the speed at which the mobile unit moves and the direction in which the mobile unit moves. The weight corrector makes it possible to carry out an adaptive control process capable of convergence within a short time even when the terminal station moves and also when the terminal station is making intermittent communication sessions such as packet communications.

Another embodiment of the motile communication device according to the present invention will be described below.

With the motile communication device according to the other embodiment of the present invention, position estimator 601 has speed estimators 611 through 61N for estimating the speed at which the terminal station moves based on a change in the pilot signal that is outputted from beam combiner 401.

With this arrangement, the speed of the terminal station can be estimated, and even when intermittent communication sessions such as packet communications are being made, it is possible to perform an adaptive beam control process depending on the position of the terminal station for maximizing a signal-to-noise/interference ratio for a terminal station which is being handled and minimizing interferences for other terminal stations.

Still another embodiment of the motile communication device according to the present invention will be described below with reference to FIG. 4.

Figure 4:
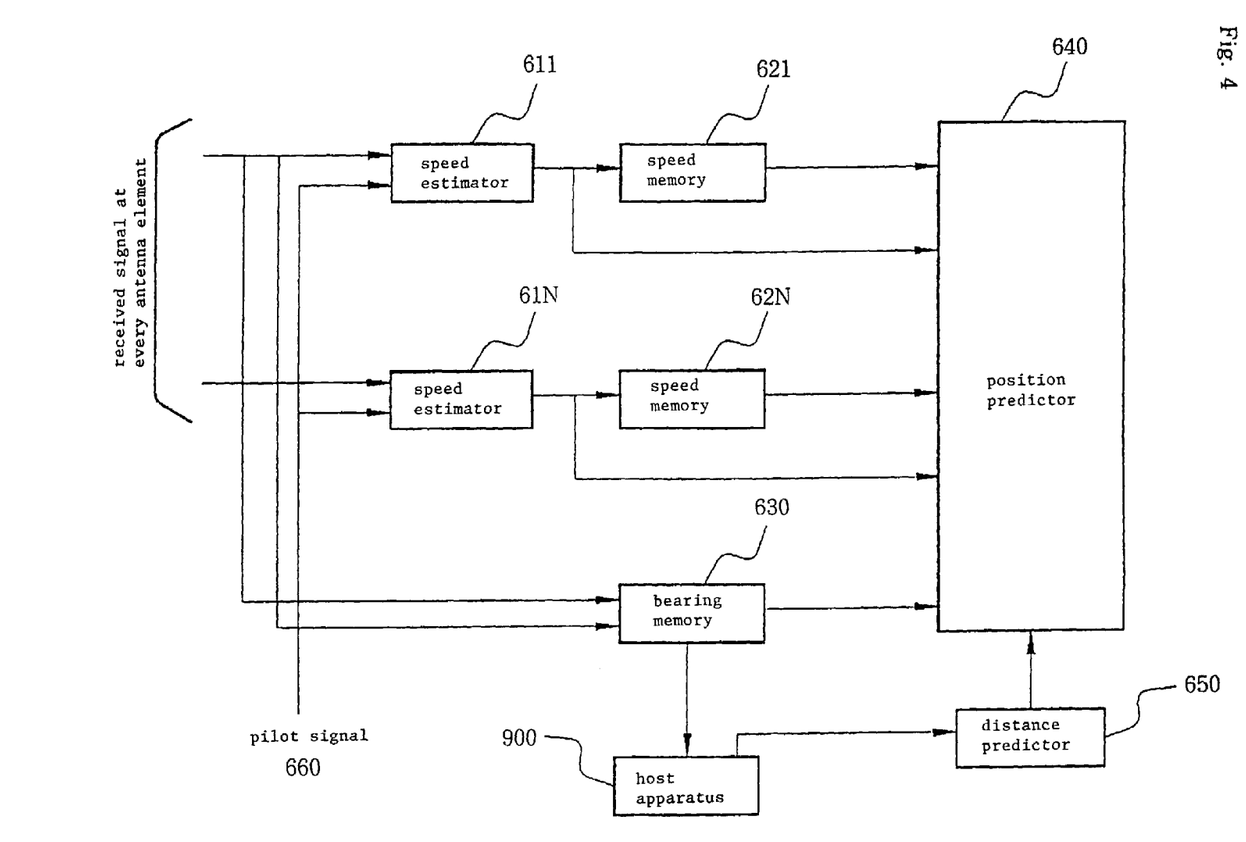
FIG. 4 is a diagram showing an arrangement and operation of another position estimator for use in the mobile unit communication apparatus according to the present invention.

FIG. 4 is a diagram showing an arrangement and operation of another position estimator for use in the mobile unit communication apparatus according to the present invention. The position estimator in the mobile unit communication apparatus shown in FIG. 4 differs from the position estimator shown in FIG. 3 in that it has distance predictor 650. Distance predictor 650 calculates an estimated distance from the base station based on a trigonometrical measurement process using the estimated bearing outputted from bearing memory 630 and estimated bearings calculated by another base station which are transmitted from a host apparatus 900 connected to a plurality of base stations. The estimated distance calculated by distance predictor 650 is outputted to position predictor 640 for positional prediction.

With the above arrangement, distance information representing a distance from the base station for the terminal station is calculated based on the trigonometrical measurement process from calculated bearings from a plurality of base stations. Therefore, the base station is capable of predicting the movement of the terminal station based on not only bearings, but also from distances, and hence is capable of predicting the position of the terminal station with better accuracy. Since the distance from the base station to the terminal station becomes clear, it is possible to control the transmitted electric power depending on the distance from the base station to the terminal station.

Yet another embodiment of the motile communication device according to the present invention will be described below with reference to the drawings.

Figure 5:
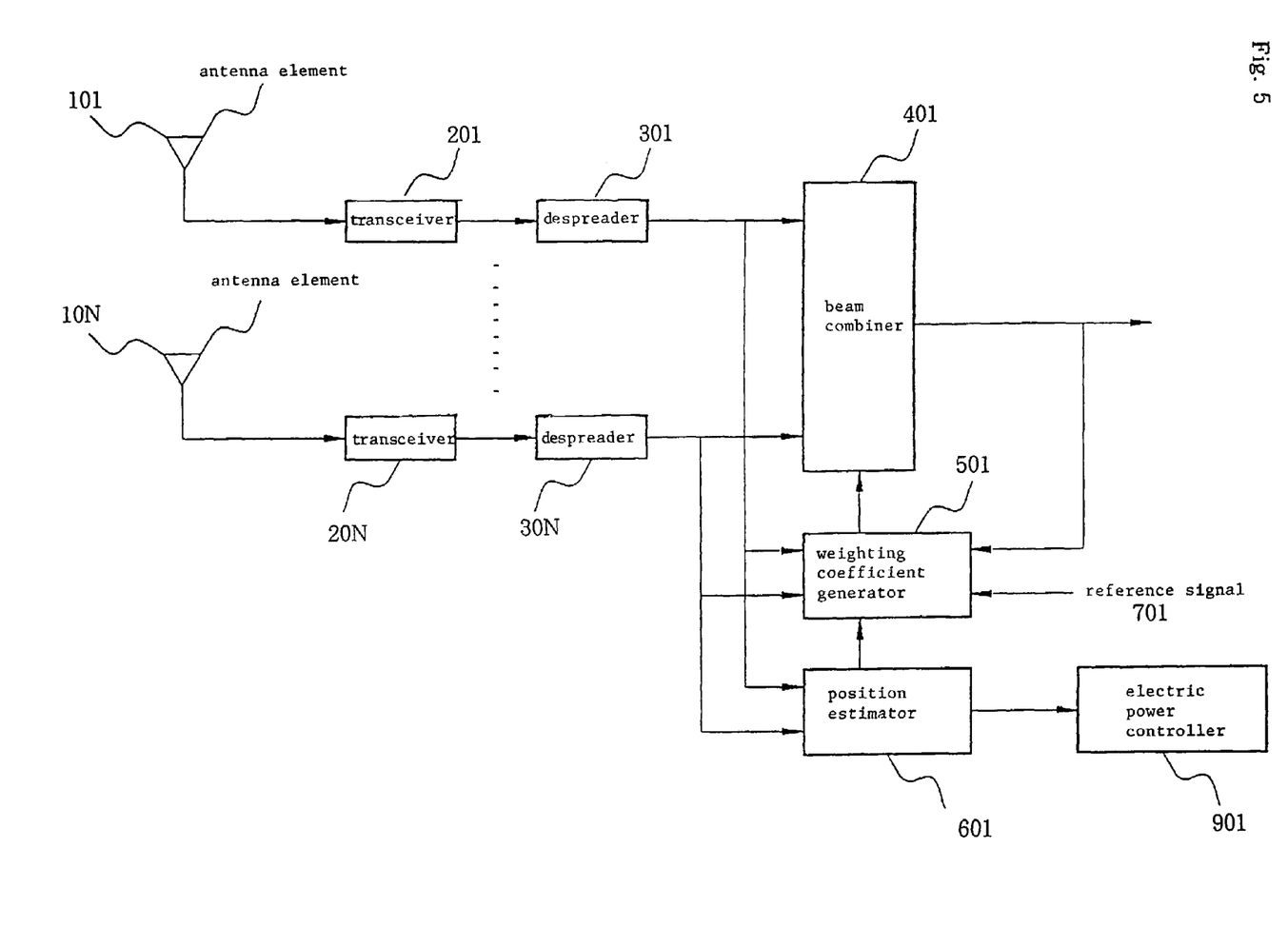
FIG. 5 is a diagram showing an arrangement and operation of another mobile unit communication apparatus according to the present invention.

FIG. 5 is a diagram showing an arrangement and operation of another mobile unit communication apparatus according to the present invention. The mobile unit communication apparatus shown in FIG. 5 differs from the mobile unit communication apparatus shown in FIG. 2 in that it has transmitted electric power controller 901. Transmitted electric power controller 901 is supplied with an estimated distance between the terminal station and the base station which is outputted from position estimator 601, and increases or reduces the electric power transmitted to the terminal station. Transmitted electric power controller 901 is also capable of controlling the electric power transmitted from the terminal station by sending transmitted electric power control information to the terminal station. Since the mobile unit communication apparatus can control the electric power transmitted from the base station and can also control the electric power transmitted from the terminal station, it is possible to perform communications with optimum electric power and reduce interferences with other terminal stations.

INDUSTRIAL APPLICABILITY

As described above, the mobile unit communication apparatus according to the present invention capable of providing excellent communication quality by orienting the beam directivity of an adaptive antenna to a terminal station in mobile communications which encounter intermittent communication sessions from mobile units, such as packet communications.

The invention claimed is:

1. A mobile unit communication apparatus remote from a mobile unit comprising:
    an adaptive antenna having a plurality of antenna elements to which weighting coefficients are applied to radiate beams that are adapted to radio wave environments;
    a position estimator which performs position calculations for estimating a position to which said mobile unit will move based on transmitted signals which do not contain position information from said mobile unit received by said antenna;
    a beam combiner for weighting said received signals and for combining beams; and
    a weighting coefficient generator which reduces a time required for convergence of the position calculations,
    wherein said weighting coefficient generator corrects weighting coefficients adapted to radio wave environments, which give initial weights to said received signals to form nulls in bearings other than said mobile unit based on the position of the mobile unit which has been estimated by said position estimator.

2. A mobile unit communication apparatus remote from a mobile unit according to claim 1, wherein said position estimator has a speed estimator supplied with said received signals, for estimating a speed of said mobile unit based on a phase shift from a reference value of a predetermined pilot signal component.

3. A mobile unit communication apparatus remote from a mobile unit according to claim 2, further comprising a weight corrector for correcting the weights of said received signals with estimated values of the speed at which said mobile unit moves and a direction in which said mobile unit moves.

4. A mobile unit communication system comprising a mobile unit communication apparatus remote from a mobile unit according to claim 3 wherein said position estimator has a distance predictor, a transmitted electric power controller for controlling transmitted electric power depending on a predicted distance, and a transmitted electric power controller mounted on a mobile unit for transmitting a predicted distance to the mobile unit and controlling transmitted electric power of the mobile unit depending on the predicted distance.

5. A mobile unit communication system comprising a mobile unit communication apparatus remote from a mobile unit according to claim 2 wherein said position estimator has a distance predictor, a transmitted electric power controller for controlling transmitted electric power depending on a predicted distance, and a transmitted electric power controller mounted on a mobile unit for transmitting a predicted distance to the mobile unit and controlling transmitted electric power of the mobile unit depending on the predicted distance.

6. A mobile unit communication apparatus remote from a mobile unit according to claim 1, wherein said position estimator has a speed estimator for estimating a speed of said mobile unit based on a change in a pilot signal output from said beam combiner.

7. A mobile unit communication apparatus remote from a mobile unit according to claim 6, further comprising a weight corrector for correcting the weights of said received signals with estimated values of the speed at which said mobile unit moves and a direction in which said mobile unit moves.

8. A mobile unit communication system comprising a mobile unit communication apparatus remote from a mobile unit according to claim 7 wherein said position estimator has a distance predictor, a transmitted electric power controller for controlling transmitted electric power depending on a predicted distance, and a transmitted electric power controller mounted on a mobile unit for transmitting a predicted distance to the mobile unit and controlling transmitted electric power of the mobile unit depending on the predicted distance.

9. A mobile unit communication system comprising a mobile unit communication apparatus remote from a mobile unit according to claim 6 wherein said position estimator has a distance predictor, a transmitted electric power controller for controlling transmitted electric power depending on a predicted distance, and a transmitted electric power controller mounted on a mobile unit for transmitting a predicted distance to the mobile unit and controlling transmitted electric power of the mobile unit depending on the predicted distance.

10. A mobile unit communication apparatus remote from a mobile unit according to claim 1, further comprising a weight corrector for correcting the weights of said received signals with estimated values of a speed at which said mobile unit moves and a direction in which said mobile unit moves.

11. A mobile unit communication system comprising a mobile unit communication apparatus remote from a mobile unit according to claim 10 wherein said position estimator has a distance predictor, a transmitted electric power controller for controlling transmitted electric power depending on a predicted distance, and a transmitted electric power controller mounted on a mobile unit for transmitting a predicted distance to the mobile unit and controlling transmitted electric power of the mobile unit depending on the predicted distance.

12. A mobile unit communication system comprising a mobile unit communication apparatus remote from a mobile unit according to claim 1 wherein said position estimator has a distance predictor, a transmitted electric power controller for controlling transmitted electric power depending on a predicted distance, and a transmitted electric power controller mounted on a mobile unit for transmitting a predicted distance to the mobile unit and controlling transmitted electric power of the mobile unit depending on the predicted distance.

* * * * *